(12) United States Patent
Wang et al.

(10) Patent No.: US 9,291,715 B2
(45) Date of Patent: Mar. 22, 2016

(54) INTERFERENCE WAVE SIGNAL REMOVING DEVICE, GNSS RECEPTION APPARATUS, MOBILE TERMINAL, INTERFERENCE WAVE SIGNAL REMOVING PROGRAM AND INTERFERENCE WAVE REMOVING METHOD

(75) Inventors: Dun Wang, Nishinomiya (JP); Hitoshi Kondo, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 198 days.

(21) Appl. No.: 14/118,210
(22) PCT Filed: Dec. 19, 2011
(86) PCT No.: PCT/JP2011/079297
§ 371 (c)(1),
(2), (4) Date: Nov. 15, 2013
(87) PCT Pub. No.: WO2012/157141
PCT Pub. Date: Nov. 22, 2012

(65) Prior Publication Data
US 2014/0106697 A1 Apr. 17, 2014

(30) Foreign Application Priority Data
May 16, 2011 (JP) ................................ 2011-109265

(51) Int. Cl.
H04B 1/10 (2006.01)
G01S 19/21 (2010.01)
H04B 1/71 (2011.01)

(52) U.S. Cl.
CPC . *G01S 19/21* (2013.01); *H04B 1/10* (2013.01); *H04B 1/1036* (2013.01); *H04B 1/7101* (2013.01)

(58) Field of Classification Search
CPC .............................. H04B 1/1036; H04B 1/123
USPC .......... 455/63.1, 296, 114.2, 67.13, 302, 307, 455/501; 375/148, 350, 346, 232; 329/318, 329/349, 353
See application file for complete search history.

(56) References Cited

U.S. PATENT DOCUMENTS

| 6,219,376 | B1* | 4/2001 | Zhodzishsky et al. | 375/148 |
| 8,238,863 | B2* | 8/2012 | Farmer et al. | 455/296 |
| 8,243,776 | B2* | 8/2012 | Tanaka et al. | 375/148 |
| 8,503,510 | B2* | 8/2013 | Tanaka et al. | 375/350 |
| 2008/0240315 | A1 | 10/2008 | De Mey et al. | |

FOREIGN PATENT DOCUMENTS

| JP | H03231542 A | 10/1991 |
| JP | 2004328639 A | 11/2004 |
| JP | 2005260860 A | 9/2005 |

OTHER PUBLICATIONS

Japanese Patent Office, International Search Report of PCT/JP2011/079297, Mar. 7, 2012, WIPO, 2 pages.

* cited by examiner

*Primary Examiner* — Sonny Trinh
(74) *Attorney, Agent, or Firm* — Alleman Hall McCoy Russell & Tuttle LLP (57) ABSTRACT

An interference wave signal removing device that can surely remove an interference wave signal is provided. An interference wave signal remover includes a controller, a notch filter, an entire-range frequency scanner, and a local frequency scanner. The controller detects the interference wave signal based on a frequency scanning result by the entire-range frequency scanner, and sets the notch filter to attenuate the interference wave signal frequency. Based on input signals to the notch filter, the local frequency scanner frequency-scans in a local frequency band including an attenuation band of the notch filter. The controller detects a frequency drift of the interference wave signal frequency based on the frequency scanning result by the local frequency scanner, and updates the setting of the notch filter to attenuate the interference wave signal frequency after the frequency drift.

10 Claims, 7 Drawing Sheets

INTERFERENCE WAVE SIGNAL REMOVING DEVICE, GNSS RECEPTION APPARATUS, MOBILE TERMINAL, INTERFERENCE WAVE SIGNAL REMOVING PROGRAM AND INTERFERENCE WAVE REMOVING METHOD

TECHNICAL FIELD

The present invention mainly relates to an interference wave signal removing device which removes an interference wave signal different from a signal and the like to be received, and a GNSS reception apparatus and a mobile terminal provided with the interference wave signal removing device.

BACKGROUND ART

GNSS (Global Navigation Satellite Systems) such as a GPS (Global Positioning System) are used for, for example, positioning by receiving GNSS signals broadcasted from positioning satellites. Each GNSS signal is comprised of a spread spectrum signal which is code modulated by a pseudo noise.

When receiving such a GNSS signal, if a signal other than the GNSS signal (hereinafter, referred to as the interference wave signal) is received, a disadvantage may be caused, for example, reception sensitivity to the GNSS signal degrades.

Figure 1:
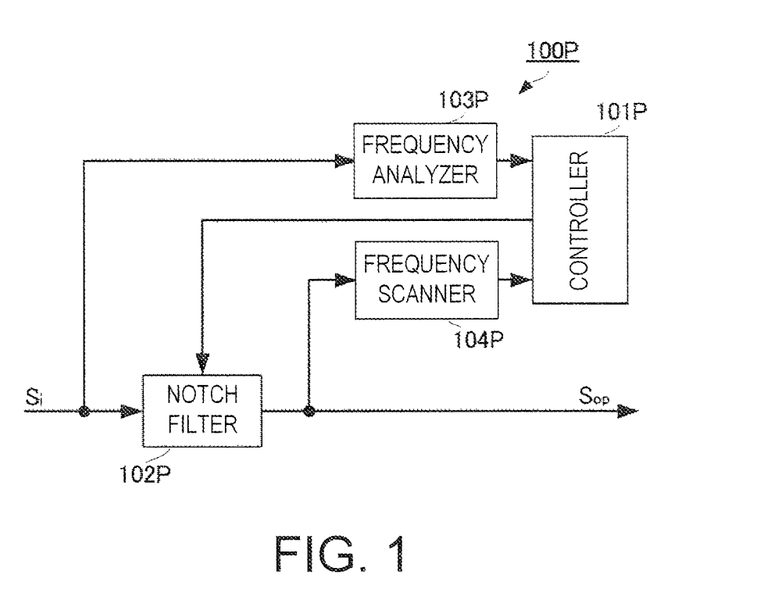
FIG. 1 is a block diagram of main circuits of the conventional interference wave signal removing device 100P disclosed in Patent Document 1.

Therefore, Patent Document 1 and Patent Document 2 disclose interference wave signal removing devices for detecting and removing interference wave signals of which frequency bands are narrow (having narrow bands) different from GNSS signals. FIG. 1 is a block diagram of main circuits of the conventional interference wave signal removing device 100P disclosed in Patent Document 1.

The conventional interference wave signal removing device 100P disclosed in Patent Document 1 includes a controller 101P, a notch filter 102P, a frequency analyzer 103P, and a frequency scanner 104P. The controller 101P specifies a frequency of an interference wave signal based on a frequency spectrum of an input signal $S_i$ obtained from the frequency analyzer 103P and a frequency spectrum of an output signal $S_{op}$ obtained from the frequency scanner 104P. Further specifically, the specification of the interference wave signal frequency is performed by the following processing. The controller 101P adjusts the attenuation property of the notch filter 102P to attenuate the interference wave signal component based on the information of the specified interference wave signal frequency.

REFERENCE DOCUMENTS OF CONVENTIONAL ART

Patent Documents

Patent Document 1: US2008/0240315A1

DISCLOSURE OF THE INVENTION

Problems to be Solved by the Invention

However, the interference wave signal removing device 100P disclosed in Patent Document 1 scans and detects an interference wave signal over an entire frequency band where an interference wave signal influences the reception of the GNSS signals. Therefore, the detection cycle of the interference wave signal becomes long and causes the following problem.

Figure 2:
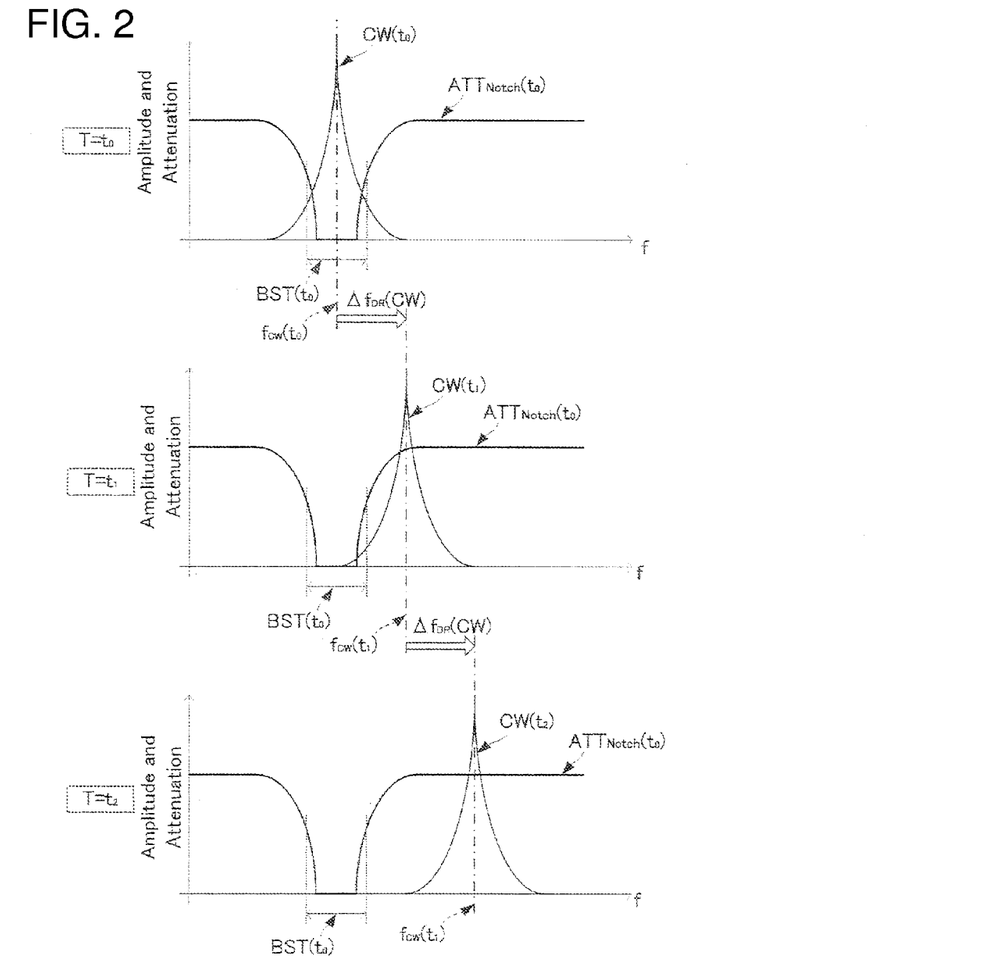
FIG. 2 illustrates charts for describing a problem caused in a case where the conventional interference wave signal removing device 100P is used.

FIG. 2 illustrates charts for describing a problem caused in a case where the conventional interference wave signal removing device 100P is used. In FIG. 2, $CW(t_0)$ indicates a spectrum of an interference wave signal at a time point $t_0$ and $f_{CW}(t_0)$ indicates a frequency thereof. $Att_{Notch}(t_0)$ indicates an attenuation property of the notch filter 102P set at the time point $t_0$. $BST(t_0)$ is an attenuation band of the notch filter 102P set at the time point $t_0$. $\Delta f_{DR}(CW)$ indicates a frequency drifting velocity of the interference wave signal CW.

$CW(t_1)$ indicates a spectrum of an interference wave signal at a time point $t_1(>t_0)$ and $f_{CW}(t_1)$ indicates a frequency thereof. $CW(t_2)$ indicates a spectrum of an interference wave signal at a time point $t_2(>t_1)$ and $f_{CW}(t_2)$ indicates a frequency thereof.

Firstly, as the frequency $f_{CW}(t_0)$ of the interference wave signal is detected at a time point $T=t_0$ and the attenuation band $BST(t_0)$ of the notch filter 102P is set by having the frequency $f_{CW}(t_0)$ as its central frequency, the interference wave signal $CW(t_0)$ will be in the attenuation band $BST(t_0)$ at this timing, and the interference wave signal $CW(t_0)$ is removed by the notch filter 102P.

Here, in a case of being an interference wave signal where the frequency of the interference wave signal CW changes sequentially, as illustrated in the order of the upper, middle and lower rows in FIG. 2, the frequency of the interference wave signal drifts. The rate of the change of this interference wave frequency per unit of time is the frequency drift velocity $\Delta f_{DR}(CW)$.

In the case of being the interference wave signal with such a frequency drift, if the scanning and detection interval of the interference wave signal is long as the conventional interference wave signal removing device 100P, as illustrated in FIG. 2, the frequency $f_{CW}(t_1)$ of the interference wave signal $CW(t_1)$ at the time point $t_1$ and the frequency $f_{CW}(t_2)$ of the interference wave signal $CW(t_2)$ at the time point $t_2$ will reach out of the attenuation band $BST(t_0)$ of the notch filter that was supposedly set appropriately at the time point $t_0$. Therefore, the interference wave signal will be not able to be continuously removed appropriately.

Specifically, in the following case, the situation as described above occurs. In the frequency scanner 104P, the frequency scan bandwidth is set to 5 MHz and the width of a scan frequency BIN is set to 1 kHz. Thus, the scanning is performed 5,000 times. An integrating period of time for each scan frequency BIN is 1 msec.; therefore, a scanning period of time required for scanning the entire frequency band is 5 sec.

Here, the width of the attenuation band BST of the notch filter 102P is set to 2 kHz and the frequency drift velocity $\Delta f_{DR}(CW)$ of the interference wave signal CW is set to 1 kHz/sec.

In this case, while one frequency scanning is performed, the frequency of the interference wave signal drifts by 5 sec×1 kHz/sec=5 kHz. Moreover, since the frequency shifts by 1 kHz every second, the frequency of the interference wave signal drifts by 1 kHz in the next one second. Therefore, the attenuation pole frequency of the notch filter 102P is set to the frequency of the detected interference wave signal CW and the attenuation band BST of ±1 kHz is set. One second later, the frequency of the interference wave signal CW reaches out of the attenuation band, and until five seconds later in which the frequency of the interference wave signal is detected next and the notch filter 102P is updated to the detected frequency, the interference wave signal CW cannot be removed by the notch filter 102P. Then, even if the notch filter 102P is set again the five seconds later, since the frequency of the interference wave signal CW keeps drifting, the interference wave signal CW can no longer be removed similarly.

Therefore, the present invention aims to provide an interference wave signal removing device that is also able to appropriately keep removing an interference wave signal of which a frequency drifts.

SUMMARY OF THE INVENTION

This invention is in regard to an interference wave signal removing device for removing an interference wave signal different from a desired signal, which includes a notch filter, a first frequency scanner, a second frequency scanner, and a controller.

The notch filter is adjustable of an attenuation frequency band. The attenuation frequency band and an attenuation property are determined based on the setting control of the attenuation frequency band from the controller.

The first frequency scanner frequency-scans output signals of the notch filter and detects a first signal intensity frequency spectrum. Here, the first frequency band is an entire frequency band where the interference wave signal that influences a reception sensitivity of a GNSS signal may exist.

The second frequency scanner frequency-scans input signals of the notch filter in a second frequency band narrower than the first frequency band and based on the attenuation frequency band, and detects a second signal intensity frequency spectrum.

The controller estimates a frequency of the interference wave signal based on the first signal intensity frequency spectrum and the second signal intensity frequency spectrum. The controller sets the attenuation frequency band based on the frequency of the interference wave signal.

With this configuration, the first frequency scanner performs frequency scanning of the interference wave signal in the entire frequency band in which the interference wave signal should be detected. The controller sets the attenuation frequency band of the notch filter based on the frequency scanning result of the interference wave signal in the entire frequency band in which the interference wave signal should be detected, which is obtained by the first frequency scanner. On top of this, the controller tracks the frequency of the interference wave signal by using the frequency scanning result of the interference wave signal in the narrow frequency band (local frequency band) containing the attenuation frequency band of the notch filter, which is obtained by the second frequency scanner. The controller sequentially sets to update the attenuation frequency band of the notch filter.

By using the narrow frequency scanning band as the local frequency band as above, the scan interval is shortened, and even if the frequency of the interference wave signal drifts, the frequency of the interference wave signal can surely be tracked, and the frequency of the interference signal can be kept in the attenuation frequency band.

Moreover, with the interference wave signal removing device of this invention, the notch filter may include a plurality of notch filters and are connected in series. The second frequency scanner may be provided for each of the plurality of notch filters.

Each of the second frequency scanners set for each notch filter may scan the input signals of the notch filter as a setting target in the second frequency band set to each second frequency scanner. Each of the second frequency scanners may detect the second signal intensity frequency spectrum for each notch filter and outputs the frequency spectrum to the controller.

Based on the second signal intensity frequency spectrum outputted from each second frequency scanner, the controller may set the attenuation frequency band of each notch filter.

With this configuration, even when a plurality of interference wave signals exist, the frequency tracking is performed on each of the interference wave signals. Therefore, even if a plurality of interference wave signals exist, they can be removed by being tracked by each of the plurality of notch filters.

Moreover, with the interference wave signal removing device of this invention, the second frequency scanner may set scan frequency bins having a narrower frequency band than scan frequency bins set by the first frequency scanner.

With this configuration, the tracking accuracy of the interference wave signal frequency in the local frequency band described above improves.

Moreover, with the interference wave signal removing device of this invention, the notch filter may include a down-converter for multiplying the input signal by an attenuation pole setting signal for setting the attenuation frequency band outputted from the controller, a baseband signal generator for generating a baseband signal by extracting a baseband component of the down-converted signal, a subtracting element for subtracting the baseband signal from the down-converted signal, and an up-converter for multiplying the subtracted signal by the attenuation pole setting signal. The notch filter may output the baseband signal to the controller. The controller may detect removal of the interference wave signal based on the baseband signal. When the controller detects the successful removal of the interference wave signal, it may release the setting of the attenuation frequency band to the notch filter.

With this configuration, a specific configuration of the notch filter is shown. Moreover, with this configuration, the baseband element of the down-converted signal obtained by multiplying the input signal by the attenuation pole setting signal corresponds to the frequency element of the interference wave signal. Therefore, by outputting the baseband signal to the controller, the controller can accurately detect the continuation and the removal of the interference wave signal. That is, the interference wave signal described above of which the frequency drifts can be tracked and the removal of the interference wave signal can be detected more promptly.

Further, with this configuration, a circuit configuration only for extracting the frequency element of the interference wave signal from the input signal is not required. Therefore, an interference wave signal removing device can be realized with a simpler configuration. Moreover, this configuration is further effective also in a case where a plurality of stages of notch filters exist and the continuation and the removal of a plurality of interference wave signals are checked individually.

Furthermore, this invention relates to a GNSS reception apparatus for receiving and demodulating GNSS signals. The GNSS reception apparatus includes the interference wave signal removing device described above, a receiver, an acquirer/tracker, and a positioning operator. The receiver is connected before the interference wave signal removing device. The receiver receives GNSS signals as desired signals, generates GNSS reception signals, and outputs them to the interference wave signal removing device. The acquirer/tracker acquires and tracks the GNSS reception signals after the interference wave signal removal.

With this configuration, since the interference wave signal of which the frequency drifts is surely removed as described above, the speed and the accuracy of acquiring and tracking thereof improve. The positioning operator may perform positioning by using the tracked GNSS signals. Moreover, due to the improvement of the speed and the accuracy of the acquiring and the tracking, the converging speed of the positioning operation and the accuracy of the positioning result improve.

Furthermore, this invention relates to a mobile terminal. The mobile terminal includes the GNSS reception apparatus described above and an application processor for performing a predetermined application by using the positioning operation result of the positioning operator. With this configuration, the GNSS reception apparatus described above is provided, and the highly accurate positioning result can be utilized. Therefore, the performance of the application using the positioning result improves.

Effect of the Invention

According to this invention, an interference wave removing device that can surely remove an interference wave of which a frequency drifts can be realized.

MODE FOR CARRYING OUT THE INVENTION

An interference wave signal removing device according to a first embodiment of the present invention is described with reference to the drawings. The interference wave signal removing device of this embodiment functions as an interference wave signal remover 50 of a GNSS reception apparatus 10.

Figure 3:
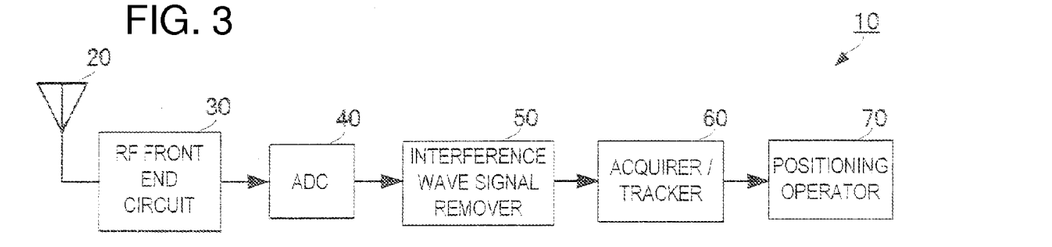
FIG. 3 is a block diagram of a GNSS reception apparatus 10 according to a first embodiment.

FIG. 3 is a block diagram of a GNSS reception apparatus 10 according to the first embodiment. The GNSS reception apparatus 10 includes a GNSS antenna 20, an RF front end circuit 30, an analog-to-digital converter (ADC) 40, an interference wave signal remover 50, an acquirer/tracker 60, and a positioning operator 70. The GNSS antenna 20 receives wireless signals including GNSS signals and outputs them to the RF front end circuit 30.

Each GNSS signal is a signal obtained by code-modulating a carrier wave signal with a pseudo noise, and is a spread spectrum signal in which frequency components spread in a wide band and each frequency component has a low spectral intensity. Moreover, for example, when it is an L1 wave signal of GPS signals, a navigation message is superimposed thereon.

Here, when an interference wave signal exists and a frequency of the interference wave signal is within a reception frequency band of the antenna, the reception signals contain the interference wave signal on top of the GNSS signal.

The RF front end circuit 30 converts the reception signal into an intermediate frequency signal (IF signal) and outputs it to the ADC 40. The ADC 40 samples the analog IF signal at a predetermined sampling interval to generate a digital IF signal and outputs it to the interference wave signal remover 50.

Although the specific configuration and processing are described later, the interference wave signal remover 50 removes the interference wave signal contained in the reception signals (IF signals) and outputs the signals only containing the GNSS signals to the acquirer/tracker 60. Here, the interference wave signal remover 50 surely removes a frequency-drifting interference wave signal where its frequency sequentially changes, in addition to the interference wave signal where its frequency does not change sequentially.

The acquirer/tracker 60 performs a correlation between each output signal from the interference wave signal remover 50, that is the GNSS signal, and a reference signal to acquire and track a carrier phase and a code phase, and outputs the tracking result (correlation result) to the positioning operator 70. The positioning operator 70 performs a positioning operation by calculating a pseudorange or the like based on the correlation result. Here, if the navigation message is superimposed on the GNSS signals, the navigation message is demodulated and used for the positioning operation.

By using the GNSS reception apparatus 10 with such a configuration, since the GNSS signals are inputted into the acquirer/tracker 60 in a state where the interference wave signal is removed therefrom, the acquisition and the tracking are facilitated and a highly accurate positioning operation result can be obtained.

Figure 4:
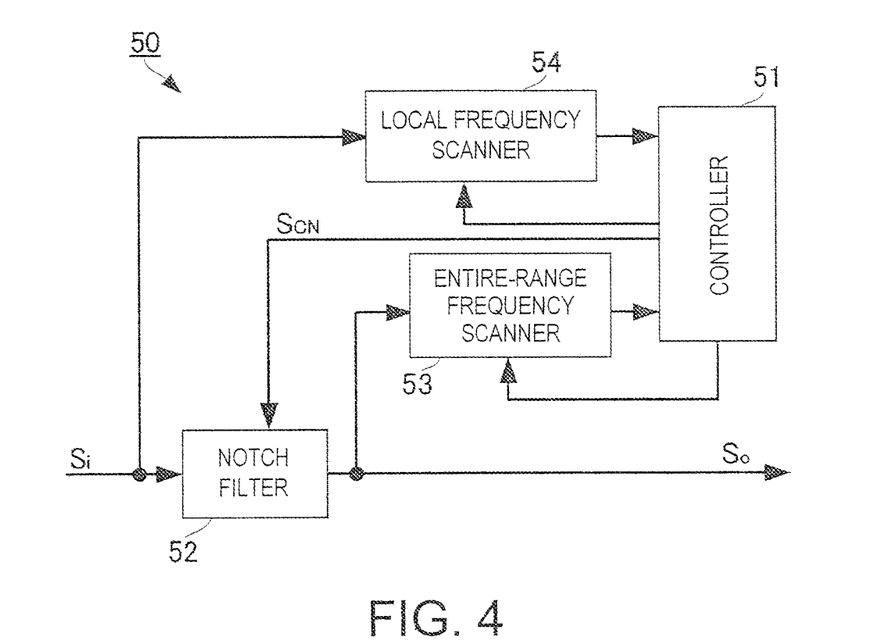
FIG. 4 is a block diagram of an interference wave signal remover 50 according to the first embodiment.
Figure 5:
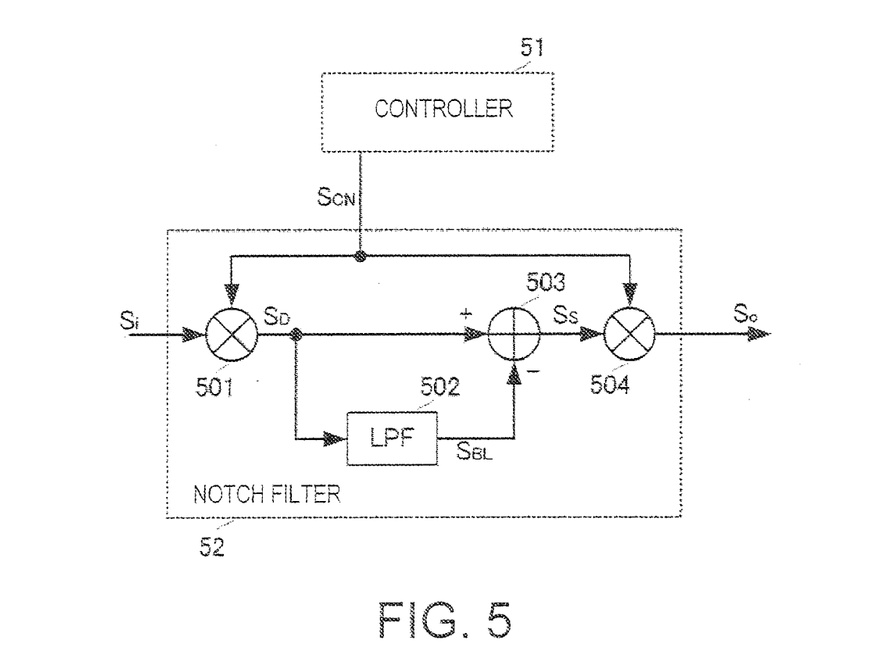
FIG. 5 is a circuit block diagram of a notch filter 52 according to the first embodiment.
Figure 6:
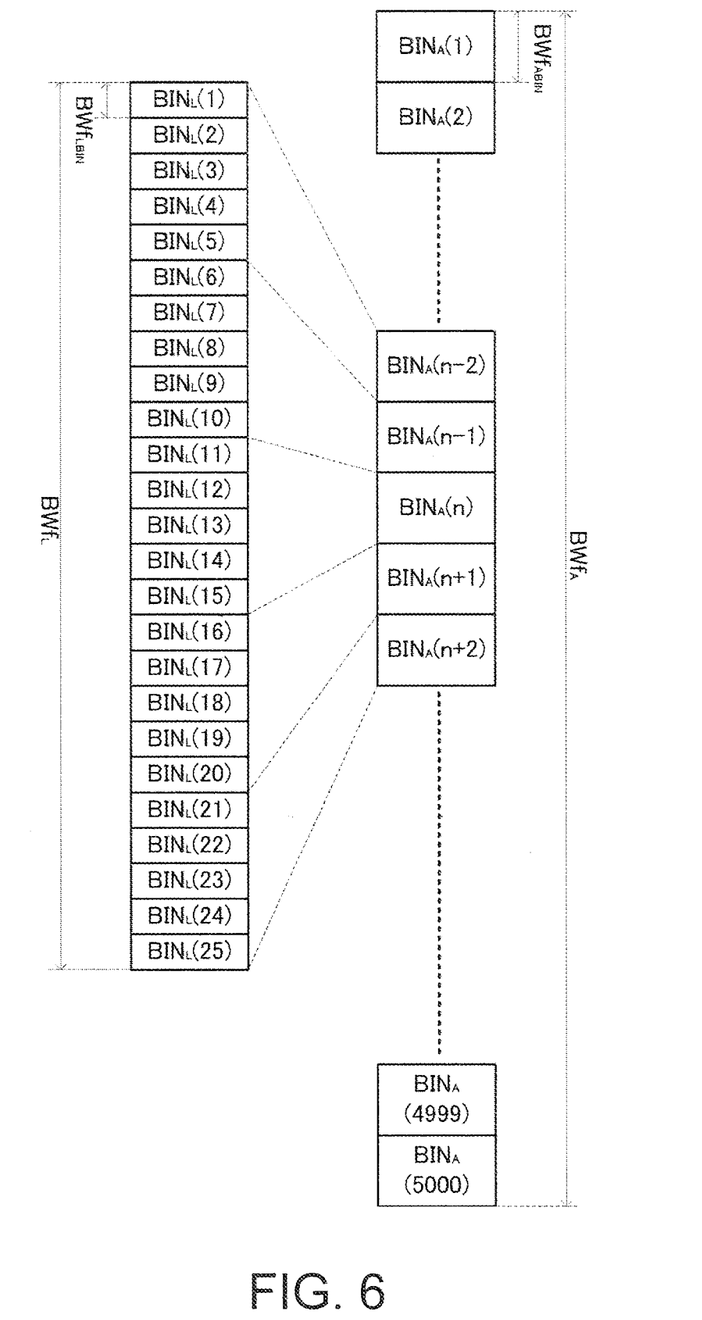
FIG. 6 is a view illustrating scan frequency bands of an entire-range frequency scanner 53 and a local frequency scanner 54 and a plurality of frequency BIN (frequency bins).

Next, the configuration and the processing of the interference wave signal remover 50 are described further in detail. For easier understanding of the description, a case where a single-stage notch filter is provided to the interference wave signal remover 50 is described. FIG. 4 is a block diagram of the interference wave signal remover 50 according to the first embodiment. FIG. 5 is a circuit block diagram of a notch filter 52 according to the first embodiment. FIG. 6 is a view illustrating scan frequency bands of an entire-range frequency scanner 53 and a local frequency scanner 54 and a plurality of frequency BIN (frequency bins).

The interference wave signal remover 50 includes a controller 51, the notch filter 52, the entire-range frequency scanner 53 corresponding to the "first frequency scanner" of the present invention, and the local frequency scanner 54 corresponding to the "second frequency scanner" of the present invention.

The controller 51 sets a scan frequency band $BWf_A$ and a bandwidth $BWf_{ABIN}$ of the scan frequency BIN for the entire-range frequency scanner 53. The scan frequency band is set to be, for example, a reception band of the GNSS antenna 20 described above or the scan frequency band $BWf_A$ (see FIG. 6) having a carrier frequency of the GNSS signal as its central frequency and that has a possibility of influencing the acquisition and tracking of the GNSS signals when an interference wave signal exists. For example, the scan frequency band $BWf_A$ is set with a frequency band of 5 MHz as described in the conventional problem above. Moreover, the bandwidth $BWf_{ABIN}$ of the scan frequency BIN is set with a frequency band of 1 kHz as described in the conventional problem above.

The entire-range frequency scanner 53 is inputted with output signals $S_O$ of the notch filter 52. Over the entire range of the scan frequency band $BWf_A$, the entire-range frequency scanner 53 integrates signal intensities of the output signals $S_O$ for every width $BWf_{ABIN}$ of the scan frequency BIN. In the setting example as described above, an integrating period of time by the entire-range frequency scanner 53 for each frequency BIN is 1 msec. The entire-range frequency scanner 53 outputs the integrated values of the detected signal intensities in the width $BWf_{ABIN}$ of every scan frequency BIN to the controller 51.

The controller 51 detects the frequency of the interference wave signal based on the integrated values of the signal intensities in the width $BWf_{ABIN}$ of every scan frequency BIN outputted from the entire-range frequency scanner 53. For example, the controller 51 sets an interference wave signal detection threshold and determines that an interference wave signal exists at the frequency where the integrated value higher than the interference wave signal detection threshold is obtained. Note that, for example, this threshold may be set to a value obtained by integrating a predetermined value to an integrated value of the signal intensities of the GNSS signals in the output signals $S_O$ in a predetermined period of time. Further, in a case where a reception status (e.g., C/No) of the GNSS signals can be determined, the threshold may be set according to the reception status.

The controller 51 sets the interference wave signal frequency to the detected frequency. Here, in a case where the controller 51 detects a plurality of frequencies, it sets the interference wave signal frequency to the frequency with the highest signal intensity. Alternatively, if the detection results are sequentially obtained, the interference wave signal frequency may be set to the frequency with the longest detection period of time. Note that, the detection of such interference wave signal frequencies is not limited to be based on the integrated value of the signal intensities, and may use the signal intensity itself or a signal power, etc.

The controller 51 outputs an attenuation band setting signal $S_{CN}$ formed of the detected interference wave signal frequency to the notch filter 52.

The notch filter 52 includes a down-converter 501, a low-pass filter 502 corresponding to the "baseband signal generator" of the present invention, an integrator 503 corresponding to the "subtracting element" of the present invention, and an up-converter 504.

The down-converter 501 is inputted with an input signal $S_i$ that is the IF signal from the ADC 40 and the attenuation pole setting signal $S_{CN}$ from the controller 51. The down-converter 501 mixes the input signal $S_i$ with the attenuation pole setting signal $S_{CN}$ and outputs a down-converted signal $S_D$. The down-converted signal $S_D$ is inputted to the low-pass filter 502 and the integrator 503.

The low-pass filter 502 low-pass-filters the down-converted signal $S_D$ to output a baseband signal $S_{BL}$. This baseband signal $S_{BL}$ corresponds to a baseband component of the signal obtained by mixing the input signal $S_i$ containing the interference wave signal with the attenuation pole setting signal $S_{CN}$ formed of the interference wave signal frequency. Therefore, the baseband signal $S_{BL}$ serves as a signal showing a state of the interference wave signal. That is, the signal intensity of the baseband signal $S_{BL}$ increases when the signal intensity of the interference wave signal is high, and the signal intensity of the baseband signal $S_{BL}$ becomes 0 (zero) when the interference wave signal is removed. This baseband signal $S_{BL}$ is inputted to the integrator 503.

The integrator 503 subtracts the down-converted signal $S_D$ by the baseband signal $S_{BL}$. By performing such processing, the component of the interference wave signal contained in the down-converted signal $S_D$ is removed. The integrator 503 outputs the subtracted signal $S_S$ to the up-converter 504.

The up-converter 504 outputs the output signal $S_O$ obtained by mixing the subtracted signal $S_S$ with the attenuation pole setting signal $S_{CN}$ to the acquirer/tracker 60.

Thus, when the interference wave signal is contained in the reception signals of the GNSS antenna 20, the output signals $S_O$ inputted to the acquirer/tracker 60 are comprised of the signals that are the reception signals with the interference wave signal removed. That is, the output signals $S_O$ formed only of the GNSS signals are outputted to the acquirer/tracker 60.

The frequency scanning over the scan frequency band $BWf_A$ by the entire-range frequency scanner 53 as described above and the removal of the interference wave signal based on this scanning result are repeatedly performed. That is, as a certain one frequency scanning over the scan frequency band $BWf_A$ ends, the next frequency scanning over the scan frequency band $BWf_A$ simultaneously starts, and this is repeated. Then, the interference wave signal detection is performed after every one scanning and it is reflected onto the notch filter 52.

On top of such an entire-range frequency scanning, the interference wave signal remover 50 of this embodiment performs a local frequency scanning based on the frequency of the detected interference wave signal and reflects onto the notch filter 52 the detection result of the interference wave signal obtained by the local frequency scanning as well.

The controller 51 outputs the attenuation pole setting signal $S_{CN}$ described above to the notch filter 52 and sets a local scan frequency band $BWf_L$, and bandwidths $BWf_{LBIN}$ of a plurality of local scan frequency BIN for the local frequency scanner 54. As illustrated in FIG. 6, the local scan frequency band has a narrower frequency bandwidth of the entire scan band and the width of each frequency BIN thereof is also set narrower with respect to the scan frequency band $BWf_A$. For example, in the example of FIG. 6, the bandwidth of the local scan frequency band $BWf_L$, is 1/10 of that of the scan frequency band $BWf_A$, and also the width of each local frequency BIN is set to 1/5 thereof. Specifically, for example, when the scan frequency band $BWf_A$ and the bandwidth $BWf_{ABIN}$ of the scan frequency BIN are set to the values described in the conventional problem above, the local scan frequency band $BWf_L$, is set to the frequency band of 5 kHz, and the width $BWf_{LBIN}$ of the local scan frequency BIN is set to the frequency band of 0.2 kHz. Further, the local scan frequency band is set such that, for example, the detected interference wave signal frequency becomes a central frequency of a specific frequency BIN.

The local frequency scanner 54 is inputted with the input signals $S_i$ of the notch filter 52. Over the local scan frequency band $BWf_L$, the local frequency scanner 54 integrates the signal intensities of the input signals $S_i$ for every width $BWf_{LBIN}$ of the local scan frequency BIN. In the setting example as described above, an integrating period of time by the local frequency scanner 54 for each frequency BIN is 5 msec. Moreover, in this case, the frequency resolution in the interference wave signal detection by the local frequency scanner 54 becomes 0.2 kHz (±0.1 kHz), and the scanning of the entire local scan frequency band $BWf_L$, only requires 125 msec.

Here, as the above-described setting is performed by the entire-range frequency scanner 53, the frequency resolution becomes 1 kHz (±0.5 kHz), and the scanning of the entire scan frequency band $BWf_A$ needs to require 5 sec.

Thus, the local frequency scanner 54 can continuously perform the scanning of the interference wave signal frequency at a high frequency resolution at a short cycle on the local frequency band which is a narrower frequency band than the scanning by the entire-range frequency scanner 53 but the interference wave signal exists therein.

The local frequency scanner 54 outputs the integrated values of the detected signal intensities of the respective local scan frequency BIN to the controller 51.

The controller 51 detects a change of the interference wave signal frequency based on the integrated values of the detected signal intensities of the respective local scan frequency BIN, and outputs the attenuation band setting signal $S_{CN}$ of which the set frequency is updated to the changed frequency.

Figure 7:
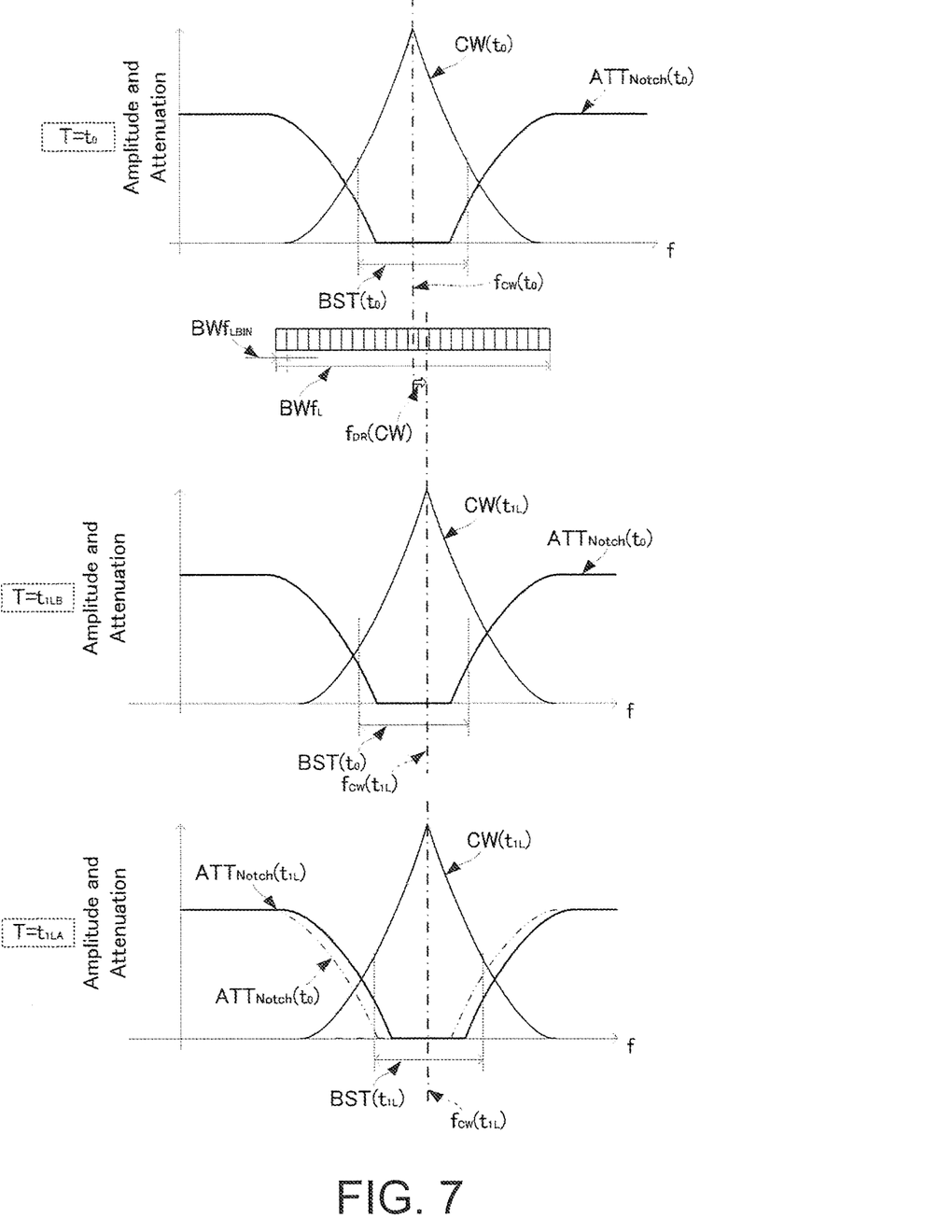
FIG. 7 illustrates charts for describing a concept of tracking a frequency drift-type interference wave signal and removing it with a configuration and processing of the first embodiment.

By such processing, operations and effects as illustrated in FIG. 7 can be obtained. FIG. 7 illustrates charts for describing a concept of tracking the frequency drifting interference wave signal and removing it with the configuration and the processing of this embodiment.

In FIG. 7, $CW(t_0)$ indicates the spectrum of the interference wave signal at a time point $t_0$ and $f_{CW}(t_0)$ indicates the frequency thereof. $ATT_{Notch}(t_0)$ indicates the attenuation property of the notch filter 52 set at the time point $t_0$. $BST(t_0)$ is an attenuation band of the notch filter 52 set at the time point $t_0$. $f_{DR}(CW)$ indicates a frequency drift amount of the interference wave signal CW in the scanning time period of the entire local scan frequency band $BWf_L$.

$CW(t_{1L})$ indicates the spectrum of the interference wave signal at the time point $t_{1L}$ (=$t_0$+(total scanning time period of the entire local scan frequency band $BWf_L$)), and $f_{CW}(t_{1L})$ indicates the frequency thereof. $ATT_{Notch}(t_{1L})$ indicates the attenuation property of the notch filter 52 set at the time point $t_{1L}$.

Firstly, as the frequency $f_{CW}(t_0)$ of the interference wave signal is detected at a time point $T=t_0$ and the attenuation band $BST(t_0)$ of the notch filter 52 is set by having the frequency $f_{CW}(t_0)$ as the central frequency, the interference wave signal $CW(t_0)$ will be in the attenuation band $BST(t_0)$ at this timing, and the interference wave signal $CW(t_0)$ is removed by the notch filter 52.

When the detected interference wave signal is the frequency drift-type, at the timing when the time point $T=t_{1L}$ which is after the total scanning time period of the entire local scan frequency band $BWf_L$, the frequency $f_{CW}(t_{1L})$ of the interference wave signal CW will be $f_{CW}(t_0)+f_{DR}(CW)$.

Here, if the frequency drift speed of the interference wave signal is 1 kHz/sec as described in the conventional problem above, in a case where the local frequency scanner 54 is set in the specification described above, since the total scanning time period is 125 msec, a frequency drift amount $f_{DR}(CW)$ becomes 0.125 kHz.

At this timing (the timing when the time point $T=t_{1L}$), since the frequency bandwidth of the attenuation band $BST(t_0)$ of the notch filter 52 is set to ±1 kHz, as illustrated in the middle row of FIG. 7, even after the frequency drift, the interference wave signal $CW(t_{1L})$ is substantially entirely in the attenuation band $BST(t_0)$ and removed by the notch filter 52.

Moreover, since the local scan frequency band $BWf_L$ is set to 5 kHz, the local frequency scanner 54 can surely detect the interference wave signal frequency $f_{CW}(t_{1L})$ at the timing when the time point $T=t_{1L}$. Furthermore, since the width $BWf_{ABIN}$ (frequency resolution) of the local scan frequency BIN is set to a frequency band of 0.2 kHz (±0.1 kHz), the local frequency scanner 54 can also surely detect the frequency drift.

The interference wave signal frequency $f_{CW}(t_{1L})$ after the frequency drift detected as above is detected by the controller 51 and is set to update to the central frequency of the attenuation band of the notch filter 52.

Thus, as illustrated in the lowest row of FIG. 7, the notch filter 52 is changed in its setting to a filter of which the central frequency is $f_{CW}(t_{1L})$ and having the attenuation band $BST(t_{1L})$, and can continuously remove the interference wave signal.

The frequency scanning over such a local scan frequency band $BWf_L$, and the frequency detection (frequency tracking) of the interference wave signal based on the scanning result thereof are repeatedly performed similarly to the frequency scanning by the entire-range frequency scanner 53 described above and the interference wave signal removal based on the scanning result thereof.

As described above, by using the configuration and the processing of this embodiment, even if the interference wave signal is the frequency drift-type, the frequency thereof can be surely tracked and be removed continuously.

Note that, the local scan frequency band $BWf_L$, and the width $BWf_{LBIN}$ of the local scan frequency BIN can suitably be set according to the specification and the like of the interference wave signal that has a possibility of being received simultaneously to receiving the GNSS signal (target signal). Here, they may be set such that the frequency drift amount over the total scanning time period in the width $BWf_{LBIN}$ of the local scan frequency BIN is within the width of the attenuation band BST and a maximum frequency drift amount over the total scanning time period in the width $BWf_{LBIN}$ of the local scan frequency BIN is within the width $BWf_{LBIN}$ of the local scan frequency BIN.

Moreover, by using the configuration and the processing described above, the removal of the interference wave signal can be detected based on the result of the frequency scanning by the local frequency scanner 54. Thus, the interference wave signal removal detection can be performed earlier than the conventional interference wave signal removal detection based on the entire range frequency scanning result. Note that, in a case where the controller 51 performs the removal detection of the interference wave signal, the controller 51 cancels the output of the attenuation band setting signal $S_{CN}$ to the notch filter 52. Thus, a vacant notch filter 52 can be formed and it can be utilized for removing a newly-detected interference wave signal, for example.

Moreover, in the above configuration, the notch filter 52 may output the baseband signal $S_{BL}$ to the controller 51. In this case, the controller 51 can perform the following processing.

The controller 51 determines whether to continue or stop the output of the attenuation pole setting signal $S_{CN}$ based on the signal intensity of the baseband signal $S_{BL}$ outputted from the notch filter 52. Specifically, the controller 51 sets a determination threshold for the signal intensity of the baseband signal $S_{BL}$, and if the signal intensity is higher than the determination threshold, the attenuation pole setting signal $S_{CN}$ is continuously outputted to the notch filter 52. Thus, the interference wave signal removal continues. If the signal intensity of the baseband signal $S_{BL}$ is lower than the determination threshold, the controller 51 stops the output of the attenuation pole setting signal $S_{CN}$ to the notch filter 52. Thus, when the interference wave signal is removed, the interference wave signal attenuation function of the notch filter 52 can be stopped more rapidly.

Figure 8:
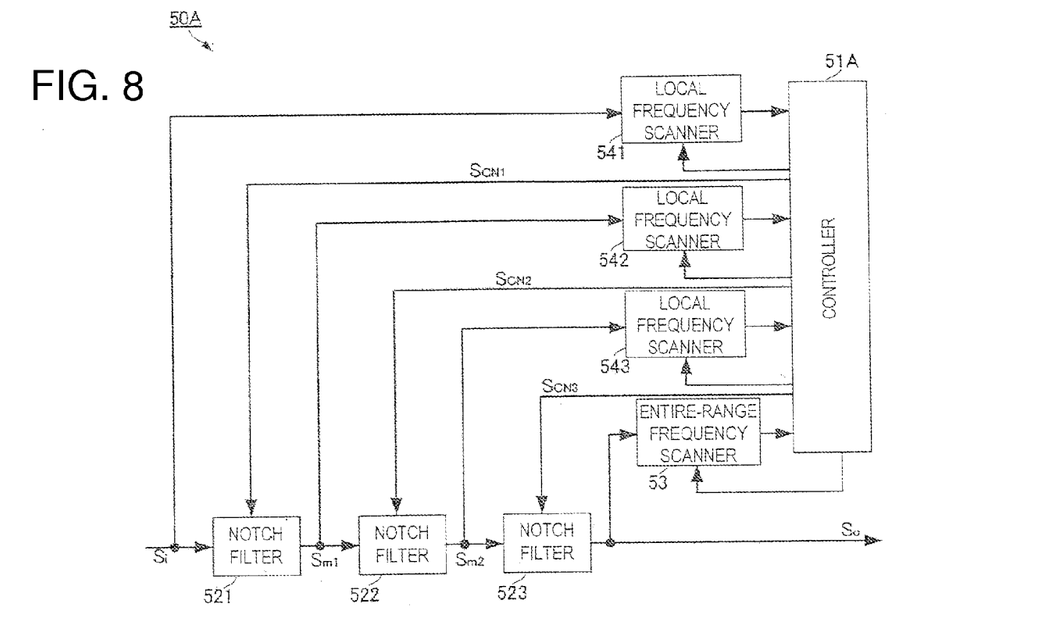
FIG. 8 is a block diagram of an interference wave signal remover 50A with multi-staged notch filters according to a second embodiment.

Next, an interference wave removing device (interference wave remover) according to a second embodiment is described with reference to the drawings. FIG. 8 is a block diagram of an interference wave signal remover 50A with multi-staged notch filters according to the second embodiment. Note that in FIG. 8, a case where three notch filters are used is illustrated; however, it may be two, four or more.

In the description, the configuration and the processing for removing only one interference wave signal from the reception signals are described; however, a plurality of interference wave signals may actually be contained in the reception signals. In such a case, the interference wave signal remover 50A with the following configuration may be used.

The interference wave signal remover 50A includes a plurality of notch filters 521, 522 and 523. Moreover, the interference wave signal remover 50A includes a plurality of local frequency scanners 541, 542 and 543 corresponding to the number of notch filters.

The notch filters 521, 522 and 523 have the same structure, which is the above-described structure illustrated in FIG. 5. In the notch filter 521, a down-converter side is connected with the ADC 40 (not illustrated) and an up-converter side is connected with a down-converter side of the notch filter 522. An up-converter side of the notch filter 522 is connected with a down-converter side of the notch filter 523, and an up-converter side of the notch filter 523 is connected with an acquirer/tracker 60 (not illustrated).

The interference wave signal remover 50A having such a configuration operates as follows.

Firstly, when the IF signals are inputted to an entire-range frequency scanner 53, for output signals $S_O$ of the final-stage notch filter 523, the entire-range frequency scanner 53 integrates signal intensities of the output signals $S_O$ for every width $BWf_{ABIN}$ of the scan frequency BIN over the entire range of the scan frequency band $BWf_A$. The entire-range frequency scanner 53 outputs the integrated values of the detected signal intensities of the width $BWf_{ABIN}$ of the respective scan frequency BIN to a controller 51A.

The controller 51A detects the interference wave signal frequency based on the signal intensities of the respective frequencies from the entire-range frequency scanner 53 as described above. Here, the controller 51A detects the interference wave signals for the number of notch filters provided to the interference wave signal remover 50A. If the number of detected interference wave signals is larger than the number of notch filters, the interference wave signals with a high signal intensity or having a long period of time of the signal intensities continuing to be higher than a threshold are preferentially detected.

The controller 51A generates attenuation pole setting signals $S_{CN1}$, $S_{CN2}$ and $S_{CN3}$ for the respective detected interference wave signal frequencies, and outputs them to the respective notch filters 521, 522 and 523. The controller 51A outputs the attenuation pole setting signal $S_{CN1}$ to the notch filter 521, the attenuation pole setting signal $S_{CN2}$ to the notch filter 522, and the attenuation pole setting signal $S_{CN3}$ to the notch filter 523, respectively. Note that, when the number of detected interference wave signal frequencies is smaller than the number of notch filters, the attenuation pole setting signals may be generated by the number of interference wave signal frequencies.

The notch filter 521 uses the attenuation pole setting signal $S_{CN1}$ to remove a first interference wave signal from the input signals $S_i$, and outputs the primary removal-processed signals $S_{m1}$ to the notch filter 522. The notch filter 522 uses the attenuation pole setting signal $S_{CN2}$ to remove a second interference wave signal from the primary removal-processed signals $S_{m1}$, and outputs the secondary removal-processed signals $S_{m2}$ to the notch filter 523. The notch filter 523 uses the attenuation pole setting signal $S_{CN3}$ to remove a third interference wave signal from the secondary removal-processed signals $S_{m2}$, and outputs the third removal-processed signals $S_{m3}$ to the acquirer/tracker 60 as output signals $S_O$.

The controller 51A performs processing of outputting the attenuation range setting signal $S_{CN1}$ to the notch filter 521 and sets a local scan frequency band $BWf_{L1}$ and a bandwidth $BWf_{LBIN1}$ of a local scan frequency BIN to the local frequency scanner 541. The controller 51A performs processing of outputting the attenuation range setting signal $S_{CN2}$ to the notch filter 522 and sets a local scan frequency band $BWf_{L2}$ and a bandwidth $BWf_{LBIN2}$ of a local scan frequency BIN to the local frequency scanner 542. The controller 51A performs processing of outputting the attenuation range setting signal $S_{CN3}$ to the notch filter 523 and sets a local scan frequency band $BWf_{L3}$ and a bandwidth $BWf_{LBIN3}$ of a local scan frequency BIN to the local frequency scanner 543.

The local frequency scanner 541 is inputted with the input signals $S_i$. Over the entire range of the local scan frequency band $BWf_{L1}$, the local frequency scanner 541 integrates signal intensities of the input signals $S_i$ for every width $BWf_{L1BIN}$ of the local scan frequency BIN. The local frequency scanner 541 outputs the integrated values of the detected signal intensities of the respective local scan frequency BIN to the controller 51A.

The controller 51A detects a change of the interference wave signal frequency based on the integrated values of the detected signal intensities of the respective local scan frequency BIN from the local frequency scanner 541, and outputs to the notch filter 521 the attenuation band setting signal $S_{CN1}$ of which the set frequency is updated to the changed frequency.

The local frequency scanner 542 is inputted with the primary removal-processed signals $S_{m1}$. Over the entire range of the local scan frequency band $BWf_{L2}$, the local frequency scanner 542 integrates signal intensities of the primary removal-processed signals $S_{m1}$ for every width $BWf_{L2BIN}$ of the local scan frequency BIN. The local frequency scanner 542 outputs the integrated values of the detected signal intensities of the respective local scan frequency BIN to the controller 51A.

The controller 51A detects a change of the interference wave signal frequency based on the integrated values of the detected signal intensities of the respective local scan frequency BIN from the local frequency scanner 542, and outputs to the notch filter 522 the attenuation band setting signal $S_{CN2}$ of which the set frequency is updated to the changed frequency.

The local frequency scanner 543 is inputted with the secondary removal-processed signals $S_{m2}$. Over the entire range of the local scan frequency band $BWf_{L3}$, the local frequency scanner 543 integrates signal intensities of the secondary removal-processed signals $S_{m2}$ for every width $BWf_{L3BIN}$ of the local scan frequency BIN. The local frequency scanner 543 outputs the integrated values of the detected signal intensities of the respective local scan frequency BIN to the controller 51A.

The controller 51A detects a change of the interference wave signal frequency based on the integrated values of the detected signal intensities of the respective local scan frequency BIN from the local frequency scanner 543, and outputs to the notch filter 523 the attenuation band setting signal $S_{CN3}$ of which the set frequency is updated to the changed frequency.

By having such a configuration, the interference wave signal removal by the notch filters and the update setting processing of the notch filters performed by the tracking of the interference wave signal frequency can be performed for each of a plurality of interference wave signals, and an interference wave signal remover that is more practical can be realized.

Figure 9:
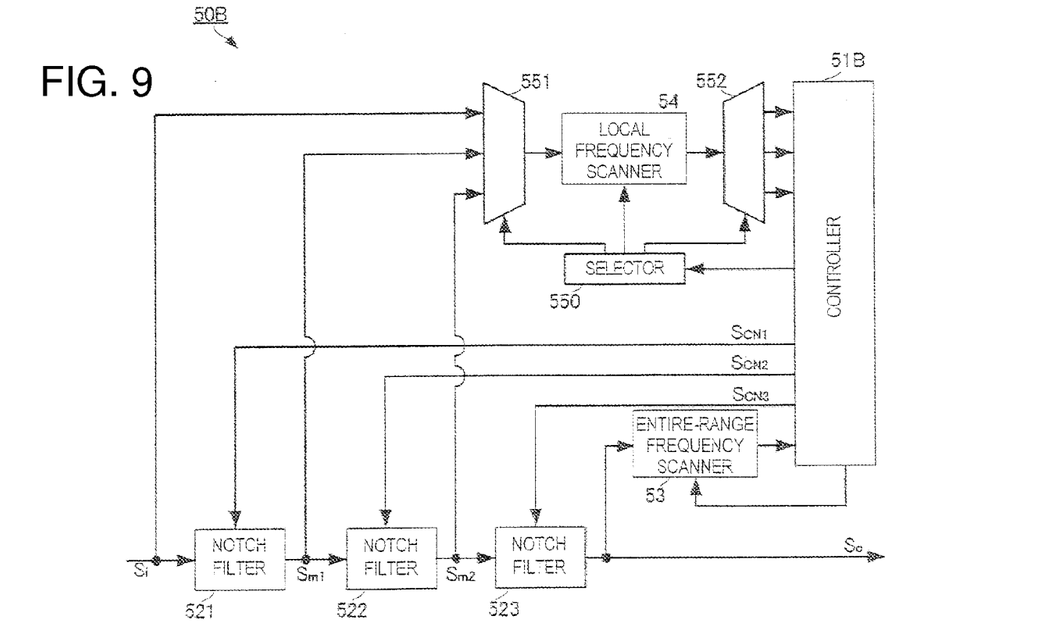
FIG. 9 is a block diagram of an interference wave signal remover 50B with multi-staged notch filters according to a third embodiment.

Next, an interference wave signal removing device (interference wave remover) according a third embodiment is described with reference to the drawings. FIG. 9 is a block diagram of an interference wave signal remover 50B with multi-staged notch filters according to the third embodiment. Note that, also in FIG. 9, a case where three notch filters are used is illustrated; however, it may be two, four or more.

The interference wave signal remover 50B of this embodiment is only different regarding the components for performing a local frequency scanning, and other configuration thereof is the same as that of the interference wave signal remover 50A described in the second embodiment.

A multiplexer 551 is connected before a local frequency scanner 54 having a similar configuration to that of the above embodiments. A demultiplexer 552 is connected before the local frequency scanner 54.

A selector 550 is inputted with scan target selected information, and information regarding a local scan frequency band $BWf_L$, and a bandwidth $BWf_{LBIN}$ of the local scan frequency BIN from a controller 51B. The scan target selected information is information for selecting which one of the plurality of notch filters 521, 522 and 523 of which the corresponding local frequency scanning is to be performed. Moreover, the local scan frequency band $BWf_L$, and the bandwidth $BWf_{LBIN}$ of the local scan frequency BIN are set according to the selected notch filter.

The selector 550 outputs the selected signal to the multiplexer 551 and the multiplexer 552 according to the scan target selected information. Moreover, the selector 550 sets the local scan frequency band $BWf_L$, and the bandwidth $BWf_{LBIN}$ of the local scan frequency BIN to the local frequency scanner 54. Specifically, the local frequency scanner 54 operates as follows by the processing of the selector 550.

When the notch filter 521 is selected, the multiplexer 551 performs a switch operation to input the input signals $S_i$ to the local frequency scanner 54. The local frequency scanner 54 scans frequencies in the local scan frequency band $BWf_{L1}$ with a bandwidth $BWf_{L1BIN}$ of the local scan frequency BIN. The demultiplexer 552 performs a switch operation to output the integrating result of each local scan frequency BIN to a setting module of the controller 51B for the notch filter 521.

When the notch filter 522 is selected, the multiplexer 551 performs a switch operation to input the primary removal-processed signals $S_{m1}$ to the local frequency scanner 54. The local frequency scanner 54 scans frequencies in the local scan frequency band $BWf_{L2}$ with a bandwidth $BWf_{L2BIN}$ of the local scan frequency BIN. The demultiplexer 552 performs a switch operation to output the integrating result of each local scan frequency BIN to a setting module of the controller 51B for the notch filter 522.

When the notch filter 523 is selected, the multiplexer 551 performs a switch operation to input the secondary removal-processed signals $S_{m2}$ to the local frequency scanner 54. The local frequency scanner 54 scans frequencies in the local scan frequency band $BWf_{L3}$ with a bandwidth $BWf_{L3BIN}$ of the local scan frequency BIN. The demultiplexer 552 performs a switch operation to output the integrating result of each local scan frequency BIN to a setting module of the controller 51B for the notch filter 523.

Even with such a configuration, a plurality of interference wave signal frequencies can be continuously tracked and removed. Moreover, with this configuration, even with one local frequency scanner, a plurality of interference wave signal frequencies can be tracked.

By using any one of the interference wave signal removers having configurations described in the respective embodiments above, the acquirer/tracker 60 is inputted with the signals only containing the GNSS signals, and thus, the acquisition and tracking ability can be improved. For example, the acquiring speed or the tracking speed improves, and the tracking accuracy can be improved. Moreover, due to the tracking accuracy improvement, the accuracy of the pseudorange and the like improves and the navigation message can surely be demodulated, and a highly accurate positioning result can be obtained.

Note that, in the above description, the example is shown in which the interference wave signal frequency is set to the central frequency of the local frequency band $BWf_L$; however, it is not limited to this. For example, the position of the interference wave signal frequency may be set to a suitable position of the local frequency band $BWf_L$, according to the frequency drifting direction. Specifically, if it can be detected that the frequency gradually drifts to the high frequency side, the interference wave signal frequency may be set within the low frequency range in the local frequency band $BWf_L$.

Moreover, the mode of the processing of the controllers and the frequency scanners described in the respective embodiments above may be such that it is programmed to be saved in a hard disk, a ROM or the like, and executed by a computer.

Figure 10:
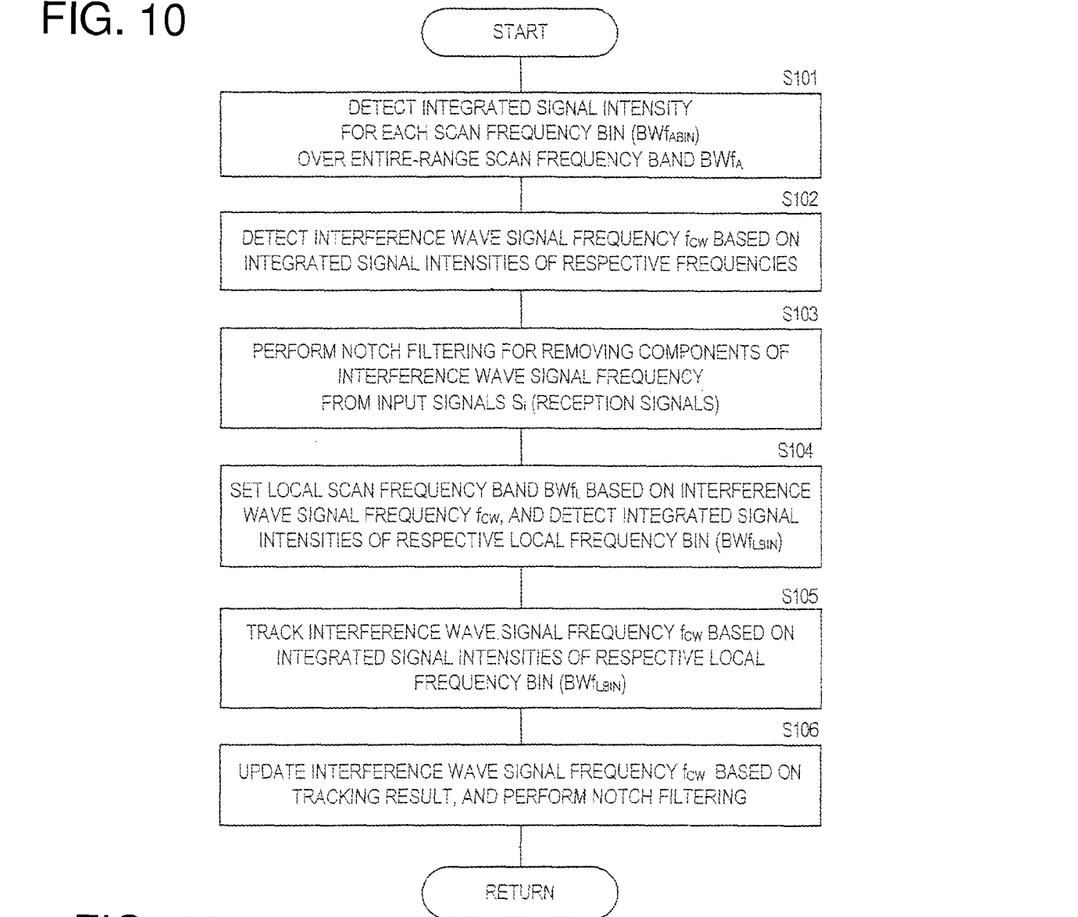
FIG. 10 is a flowchart illustrating an interference wave signal removing method according to the present invention.

In this case, for example, it may be such that the method illustrated in the flowchart shown in FIG. 10 is realized. FIG. 10 is a flowchart illustrating an interference wave signal removing method according to the present invention. Note that, in FIG. 10, the case where the number of notch filters is one is shown; however, when the number of notch filters is plural as described above, the method illustrated in FIG. 10 may be applied to each notch filter.

Firstly, over an entire range scan frequency band $BEf_A$, an integrated signal intensity is detected for each scan frequency BIN having a bandwidth $BWf_{ABIN}$ (S101). The interference wave signal frequency $f_{CW}$ is detected based on the integrated signal intensity for each scan frequency BIN (S102). Notch filtering for removing an component of the interference wave signal frequency $f_{CW}$ from the input signals $S_i$ (reception signals) is performed (S103).

In addition to such notch filtering, the local scan frequency band $BWf_L$, is set based on the interference wave signal frequency $f_{CW}$ and the integrated signal intensity is detected for each local frequency BIN having the bandwidth $BWf_{LBIN}$ ($<BWf_{ABIN}$) (S104). The interference wave signal frequency $f_{CW}$ is tracked based on the integrated signal intensity of each local frequency BIN (S105). The interference wave signal frequency $f_{CW}$ is set to update based on the tracking result, and the notch filtering is performed (S106). Note that, the processing of tracking and update-setting this interference wave signal frequency $f_{CW}$ is continuously performed until the removal of the relevant interference wave signal is detected.

Figure 11:
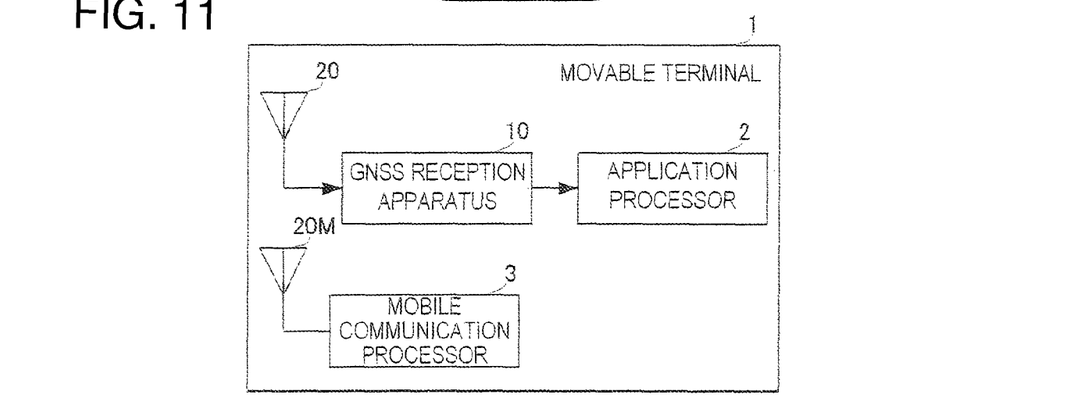
FIG. 11 is a block diagram of a substantial configuration of a mobile terminal 1 including the GNSS reception apparatus 10.

Moreover, the GNSS reception apparatus 10 having the configuration as described above may be used in a movable terminal 1 as illustrated in FIG. 11. FIG. 11 is a block diagram of a substantial configuration of the mobile terminal 1 including the GNSS reception apparatus 10.

The movable terminal 1 as illustrated in FIG. 11 is a mobile communicator such as a mobile phone, and it includes an GNSS antenna 20, the GNSS reception apparatus 10, an application processor 2, a mobile communication antenna 20M, and a mobile communication processor 3.

The application processor 2 displays a self-device position and a self-device speed based on the obtained positioning result outputted from the GNSS reception apparatus 10, uses the same for navigation, and executes various applications using the self-device position.

The mobile communication antenna 20M transceives mobile communication signals (transmission signal and reception signal). The mobile communication processor 3 generates the transmission signal for mobile communication and demodulates the reception signal for mobile communication.

With such a configuration, by using the GNSS reception apparatus 10 including any one of the interference wave signal removers described above, even if the mobile communication signal is close to the frequency of the GNSS signal and has a high signal intensity, it is surely removed by the interference wave signal remover, and the reception sensitivity of the GNSS signal does not degrade. Thus, a highly accurate positioning result can be obtained and highly accurate position display and navigation and the like can be realized. Moreover, since it becomes possible to draw the frequency band of the mobile communication signal close to the frequency band of the GNSS signal, a useable frequency band of the mobile communication signal widens and the mobile terminal 1 can be configured to be more user-friendly.

Note that, in the above description, a case is shown where the functional component realizing the mobile function and the application function utilizing a positioning result obtained by using the GNSS signals are provided in one housing; however, even in a case with a movable terminal that does not include the functional component realizing the mobile function and undesirably receives mobile communication signals externally, similar operations and effects can be obtained.

DESCRIPTION OF REFERENCE NUMERALS

- 100P: Interference Wave Removing Device; 101P: Controller; 102P: Notch Filter; 103P: Frequency Analyzer; 104P: Frequency Scanner;
- 10: GNSS Receiving Apparatus; 20: GNSS Antenna; 30: RF Front End Circuit; 40: Analog-Digital Converter (ADC); 50, 50A, 50B: Interference Wave Signal Remover; 60: Acquirer/tracker; 70: Positioning Operator;
- 51, 51A, 51B: Controller; 52, 521, 522, 523: Notch Filter; 53: Entire-range Frequency Scanner; 54, 541, 542, 543: Local Frequency Scanner; 501: Down-Converter; 502: Low-Pass Filter; 503: Integrator; 504: Up-Converter; 550: Selector; 551: Multiplexer; 552: Demultiplexer;
- 1: Mobile Terminal; 2: Application Processor; 3: Mobile Communication Processor; and 20M: Mobile Communication Antenna

The invention claimed is:

1. An interference wave signal removing device for removing an interference wave signal different from a desired signal, comprising:
   a notch filter adjustable of an attenuation frequency band;
   a first frequency scanner for frequency-scanning output signals of the notch filter and detecting a first signal intensity frequency spectrum; and
   a second frequency scanner for frequency-scanning input signals of the notch filter in a second frequency band narrower than the first frequency band and based on the attenuation frequency band, and detecting a second signal intensity frequency spectrum; and
   a controller for estimating a frequency of the interference wave signal based on the first signal intensity frequency spectrum and the second signal intensity frequency spectrum, and setting the attenuation frequency band based on the frequency of the interference wave signal.

2. The interference wave signal removing device of claim 1, wherein the notch filter includes a plurality of notch filters and are connected in series,
   wherein the second frequency scanner is provided for each of the plurality of notch filters,
   wherein each of the second frequency scanners set for each notch filter scans the input signals of the notch filter as a setting target in the second frequency band set to each second frequency scanner, detects the second signal intensity frequency spectrum for each notch filter, and outputs the frequency spectrum to the controller, and
   wherein based on the second signal intensity frequency spectrum outputted from each second frequency scanner, the controller sets the attenuation frequency band of each notch filter.

3. The interference wave signal removing device of claim 1, wherein the second frequency scanner sets scan frequency bins having a narrower frequency band than scan frequency bins set by the first frequency scanner.

4. The interference wave signal removing device of claim 1, wherein the notch filter includes:
   a down-converter for multiplying the input signal by an attenuation pole setting signal for setting the attenuation frequency band outputted from the controller;
   a baseband signal generator for generating a baseband signal by extracting a baseband component of the down-converted signal;
   a subtracting element for subtracting the baseband signal from the down-converted signal; and
   an up-converter for multiplying the subtracted signal by the attenuation pole setting signal,
   wherein the notch filter outputs the baseband signal to the controller, and
   wherein the controller detects removal of the interference wave signal based on the baseband signal and, when the successful removal of the interference wave signal is detected, releases the setting of the attenuation frequency band to the notch filter.

5. A GNSS reception apparatus, comprising:
   the interference wave signal removing device of claim 1;
   a receiver for receiving GNSS signals as desired signals, generating GNSS reception signals, and outputting them to the interference wave signal removing device;
   an acquirer/tracker for acquiring and tracking the GNSS reception signals after the interference wave signal removal; and
   a positioning operator for performing positioning by using the tracked GNSS signals.

6. A mobile terminal, comprising:
   the GNSS reception apparatus of claim 5; and
   an application processor for performing a predetermined application by using the positioning operation result of the positioning operator.

7. A non-transitory program of causing a computer to execute processing of removing an interference wave signal different from a desired signal, comprising:
   frequency-scanning, in the first frequency band, output signals of a notch filter adjustable of an attenuation frequency band, and detecting a first signal intensity frequency spectrum;
   frequency-scanning input signals of the notch filter in a second frequency band narrower than the first frequency band and based on the attenuation frequency band, and detecting a second signal intensity frequency spectrum; and estimating a frequency of the interference wave signal based on the first signal intensity frequency spectrum and the second signal intensity frequency spectrum, and setting the attenuation frequency band based on the frequency of the interference wave signal.

8. The interference wave signal removing program of claim 7, comprising:

repeatedly detecting the second signal intensity frequency spectrum for the input signals of each of a plurality of notch filters connected in series; and setting the attenuation frequency band for each notch filter based on the second signal intensity frequency spectrum.

9. A method of removing an interference wave signal different from a desired signal, comprising:

frequency-scanning output signals of a notch filter adjustable of an attenuation frequency band, and detecting a first signal intensity frequency spectrum;

frequency-scanning input signals of the notch filter in a second frequency band narrower than the first frequency band and based on the attenuation frequency band, and detecting a second signal intensity frequency spectrum; and estimating a frequency of the interference wave signal based on the first signal intensity frequency spectrum and the second signal intensity frequency spectrum, and setting the attenuation frequency band based on the frequency of the interference wave signal.

10. The interference wave signal removing method of claim 9, comprising:

repeatedly detecting the second signal intensity frequency spectrum for the input signals of each of a plurality of notch filters connected in series; and setting the attenuation frequency band for each notch filter based on the second signal intensity frequency spectrum.

* * * * *